United States Patent
Park et al.

(10) Patent No.: US 9,550,870 B2
(45) Date of Patent: Jan. 24, 2017

(54) METALLIZED NANOTUBE POLYMER COMPOSITE (MNPC) AND METHODS FOR MAKING SAME

(75) Inventors: Cheol Park, Yorktown, VA (US); Joycelyn S. Harrison, Hampton, VA (US); Negin Nazem, Blacksburg, VA (US); Larry Taylor, Christiansburg, VA (US); Jin Ho Kang, Newport News, VA (US); Jae-Woo Kim, Newport News, VA (US); Godfrey Sauti, Hampton, VA (US); Peter T. Lillehei, Yorktown, VA (US); Sharon E. Lowther, Hampton, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 603 days.

(21) Appl. No.: 12/313,945

(22) Filed: Nov. 26, 2008

(65) Prior Publication Data
US 2011/0068291 A1 Mar. 24, 2011

Related U.S. Application Data

(60) Provisional application No. 61/004,520, filed on Nov. 28, 2007.

(51) Int. Cl.
*C08J 7/02* (2006.01)
*B29C 70/88* (2006.01)
(Continued)

(52) U.S. Cl.
CPC .............. *C08J 7/02* (2013.01); *B29C 70/882* (2013.01); *C08J 3/203* (2013.01); *C08J 7/06* (2013.01);
(Continued)

(58) Field of Classification Search
None
See application file for complete search history.

(56) References Cited

U.S. PATENT DOCUMENTS

| | | | |
|---|---|---|---|
| 2003/0158323 A1* | 8/2003 | Connell | B82Y 10/00 524/495 |
| 2004/0143043 A1* | 7/2004 | Gencer et al. | 524/105 |

(Continued)

OTHER PUBLICATIONS

Ma et al(Preparation and Electromagnetic Interference Shielding Characteristics of Novel Carbon-Nanotube/Siloxane/Poly-(urea urethane) Nanocomposites, J Polymer Sci, Part B: Polymer Phys, 43, pp. 345-358, 2005).*

*Primary Examiner* — Melvin C Mayes
*Assistant Examiner* — Michael Forrest
(74) *Attorney, Agent, or Firm* — Jennifer L. Riley; Linda B. Blackburn; Robin W. Edwards

(57) ABSTRACT

A novel method to develop highly conductive functional materials which can effectively shield various electromagnetic effects (EMEs) and harmful radiations. Metallized nanotube polymer composites (MNPC) are composed of a lightweight polymer matrix, superstrong nanotubes (NT), and functional nanoparticle inclusions. MNPC is prepared by supercritical fluid infusion of various metal precursors (Au, Pt, Fe, and Ni salts), incorporated simultaneously or sequentially, into a solid NT-polymer composite followed by thermal reduction. The infused metal precursor tends to diffuse toward the nanotube surface preferentially as well as the surfaces of the NT-polymer matrix, and is reduced to form nanometer-scale metal particles or metal coatings. The conductivity of the MNPC increases with the metallization, which provides better shielding capabilities against various EMEs and radiations by reflecting and absorbing EM waves more efficiently. Furthermore, the supercritical fluid infusion (Continued)

process aids to improve the toughness of the composite films significantly regardless of the existence of metal.

18 Claims, 6 Drawing Sheets

(51) Int. Cl.
*C08J 3/20* (2006.01)
*C08J 7/06* (2006.01)
*B29K 105/16* (2006.01)
*B82Y 30/00* (2011.01)

(52) U.S. Cl.
CPC .......... *B29K 2105/167* (2013.01); *B82Y 30/00* (2013.01); *C08J 2379/08* (2013.01); *Y02P 20/544* (2015.11)

(56) References Cited

U.S. PATENT DOCUMENTS

2006/0194928 A1* 8/2006 Charpentier et al. ...... 525/333.7
2007/0265379 A1* 11/2007 Chen et al. .................... 524/404
2008/0220244 A1* 9/2008 Wai et al. ..................... 428/328
2009/0068241 A1* 3/2009 Britz et al. .................... 424/409

* cited by examiner (a) Pt/10%SWCNT/β—CNAO  (b) Ni/10%SWCNT/β—CNAO  (c) Fe/10%SWCNT/β—CNAO

METALLIZED NANOTUBE POLYMER COMPOSITE (MNPC) AND METHODS FOR MAKING SAME

CROSS REFERENCE TO RELATED APPLICATION

The present application claims priority from U.S. Provisional Application Ser. No. 61/004,520, filed Nov. 28, 2007.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

BACKGROUND OF THE INVENTION

1. Field of the Invention

The present invention relates to materials for effective shielding against non-ionizing and ionizing radiation, such as electromagnetic effects, interference, or neutrons, and, more particularly to lightweight, flexible materials with sufficiently high conductivity and magnetic properties for effective electromagnetic effects shielding.

2. Description of Related Art

To prevent damage from non-ionizing and ionizing radiation, such as electromagnetic effects, interference, or neutron electromagnetic effects (EME) such as lightning strike damage and electromagnetic interference on composite aircraft vehicles, highly conductive materials are required to protect the interior electronics, cockpits, and passenger cabins. Metallic materials such as metal layer coatings or metal meshes are often used to shield the airframes effectively from the EMEs, however, weight reduction may not be maintained with these heavy metal structures and the nature of open mesh structure may not protect some localized lightning attachment effectively. On the other hand, lightweight polymeric materials with conventional conductive inclusions may not provide sufficient conductivity required for shielding EMEs without sacrificing the mechanical properties. Metallization or metal coating can be applied directly to the inclusions such as nanotubes (NT), prior to forming the composite. However, thorough dispersion of the heavy metallized nanotubes in a polymer resin is a big challenge to accomplish.

The prior art discloses no known lightweight polymeric composite materials for achieving sufficient shielding effects against EMEs for aerospace or electronic applications. Prior work generally utilized heavy metal layers or meshes by covering the entire airframe. Metallic foams, conductive polymers, and conventional polymer composites with conductive inclusions have been employed to protect airframes from EMEs as well, but the required level of shielding effect was not achieved.

Metallic layers or coatings may provide effective shielding capabilities; however, high weight penalties of using metallic materials limit their applications. Metallic foams do not provide robust mechanical integrity to use as structural applications and the level of the conductivity may not be sufficient for the EME shielding. The conductive polymers tend to lose their conductivity at elevated temperatures (>100° C.) by dedoping or dehydration. Conventional polymer composites require very high conducting filler loadings to reach the level of conductivity for EME shielding, which often inevitably lead to reductions in strength and toughness as well as weight penalties.

Future aerospace vehicles require structural airframe materials with tailorable properties to manage the weight, temperature, structural, radiation, and electromagnetic challenges associated with high-speed, high-altitude flights. Although a number of lightweight materials such as nanostructured polymers, aerogel, honeycomb, metallic foam, and lattice block have been proposed to reduce weight of aerospace vehicles, lack of thermal stability and mechanical durability primarily limits their use for airframe structure and propulsion systems. Adding non-metallic lightweight materials in the airframe structure for weight reduction may cause new challenges such as a series of electromagnetic effects (EME) (lightning strike, Electromagnetic interference) and high altitude radiations. Therefore, highly conductive and multifunctional lightweight composite materials are required to protect aerospace vehicles from various EME and radiations. Currently, no materials can achieve this level of conductivity and functionality to protect the vehicles from EME and radiations.

The essential concept in this work is to develop novel Metallized Nanotube Polymer Composites (MNPC), which are composed of lightweight polymer matrix, superstrong nanotubes, and functional nanoparticle inclusions.

An object of the present invention is to provide lightweight, flexible materials with sufficiently high conductivity and magnetic properties for effective EME shielding.

An object of the present invention is to provide impregnated metal preferentially deposited on the nanotube surfaces inside of the composite, which can improve the conductivity of the nanotube networks.

An object of the present invention is to provide an environmentally benign process, requiring no toxic chemical solvents or reducing agents for incorporating metal particles in this invention and leaving no residual solvents behind.

An object of the present invention is to provide a method for producing lightweight EME shielding which is economically beneficial by recycling $CO_2$ fluid on a large scale.

Finally, it is an object of the present invention to accomplish the foregoing objectives in a simple and cost effective manner.

SUMMARY OF THE INVENTION

The present invention addresses these needs by providing a composite shielding material for protecting against electromagnetic effects or interference which is formed from a nanotube polymer composite with functional nanoparticles incorporated into the nanotube polymer composite. The functional nanoparticles are preferably incorporated into the nanotube polymer composite by means of supercritical fluid infusion. In the preferred embodiment, metal particles are deposited on top of dispersed nanotube percolation networks of the nanotube polymer composites preferably by means of supercritical fluid infusion or in situ polymerization. Alternatively metal layers may be deposited on top of dispersed nanotube percolation networks of the nanotube polymer composites preferably by means of supercritical fluid infusion. The manufacturing process includes the steps of preparing a nanotube polymer composite and incorporating functional nanoparticles into the nanotube polymer composite. The functional nanoparticles are incorporated into the nanotube polymer composite preferably by means of supercritical fluid infusion or in situ polymerization. In the preferred embodiment, metal particles are deposited on top of dispersed nanotube percolation networks of the nanotube polymer composites preferably by means of supercritical fluid infusion or in situ polymerization. Alternatively metal layers may be deposited on top of dispersed nanotube percolation networks of the nanotube polymer composites preferably by means of supercritical fluid infusion or in situ polymerization.

MNPC can provide lightweight, flexible materials with sufficiently high conductivity and magnetic properties for effective EME shielding. An impregnated metal is preferentially deposited on the nanotube surfaces inside of a composite, which increases the conductivity of the nanotube networks. The MNPC process is an environmentally benign process, and no toxic chemical solvents or reducing agents are required to incorporate metal particles in this invention; no residual solvents are left behind in the product in this method. The MNPC method is economically beneficial by recycling $CO_2$ fluid on a large scale. The supercritical fluid (SCF) impregnation process rapidly incorporates metal particles inside of a composite because $CO_2$ fluid has higher diffusivity than conventional fluids. Through this process, metal impregnation can be achieved deep inside of the film as well as on the surfaces. The impregnation depth is determined by the SCF impregnation conditions such as the metal precursor concentration, temperature, pressure, and time. Nano-sized metals (less than 10 nm, typically 2-5 nm in diameter) can be impregnated inside as well as outside of the nanotube composites. The SCF infusion process improves the toughness of the nanotube composites and allows infusion into complex shape samples including shaded areas. The MNPC properties are tailorable depending on the selection of polymer types, nanotube types and contents, metal precursor types and contents, SCF types and infusion conditions. Various metals can be readily incorporated into the NT-polymer composites by the SCF infusion process.

BRIEF DESCRIPTION OF THE DRAWINGS

A more complete description of the subject matter of the present invention and the advantages thereof, can be achieved by the reference to the following detailed description by which reference is made to the accompanying drawings in which.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention.

Figure 1:
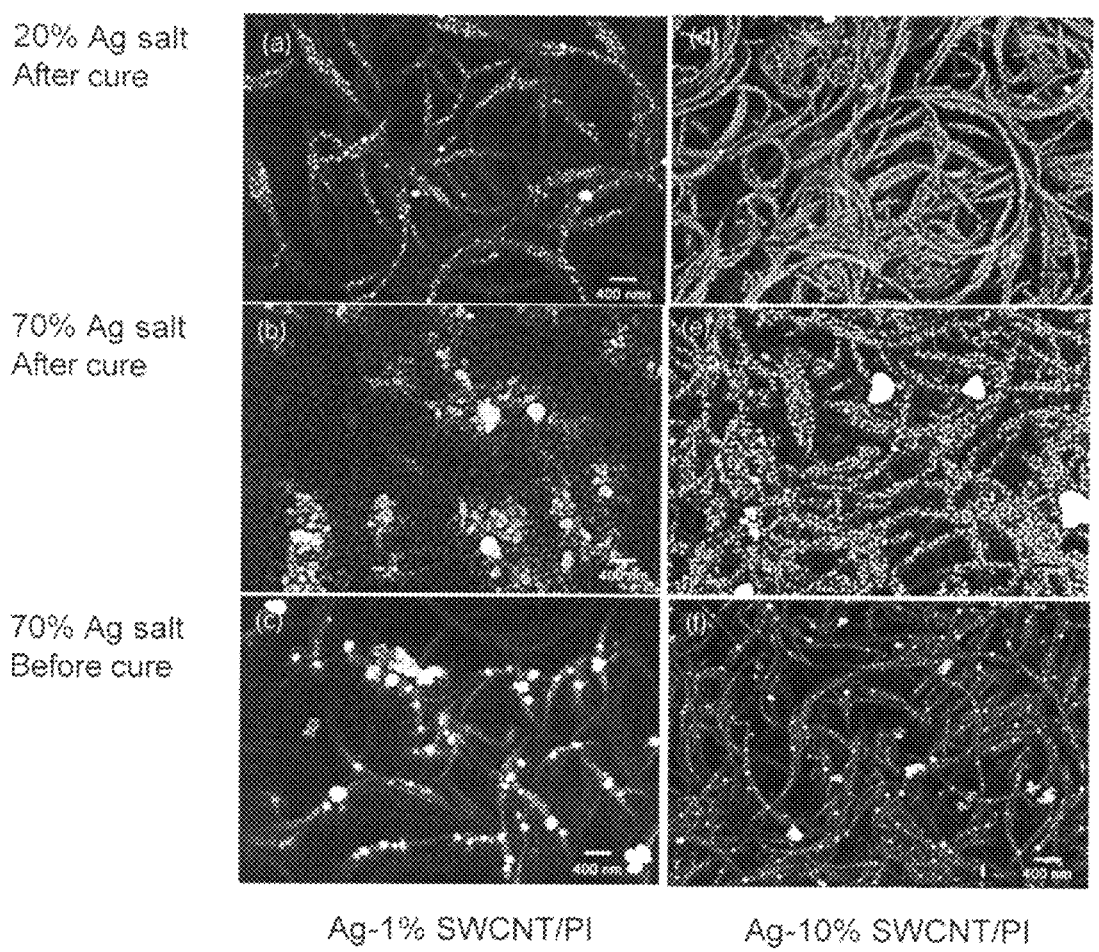
FIG. 1a shows a high resolution scanning electron micrograph (HRSEM) of Ag/1 wt % SWCNT/β-CNAO at a high accelerating voltage prepared by 20% metallization solution.
FIG. 1b shows a high resolution scanning electron micrograph (HRSEM) of Ag/1 wt % SWCNT/βCNAO at a high accelerating voltage prepared by 70% metallization solution.
FIG. 1c shows a high resolution scanning electron micrograph (HRSEM) of Ag/1 wt % SWCNT/β-CNAO at a high accelerating voltage prepared by 70% metallization solution before curing.
FIG. 1d shows a high resolution scanning electron micrograph (HRSEM) of Ag/10 wt % SWCNT/β-CNAO at a high accelerating voltage prepared by 20% metallization solution after curing.
FIG. 1e shows a high resolution scanning electron micrograph (HRSEM) of Ag/10 wt % SWCNT/β-CNAO at a high accelerating voltage prepared by 70% metallization solution after curing.
FIG. 1f shows a high resolution scanning electron micrograph (HRSEM) of Ag/10 wt % SWCNT/β-CNAO at a high accelerating voltage prepared by 70% metallization solution before curing.

First, uniformly dispersed nanotube polymer composites are prepared and then additional functional nanoparticles are incorporated into the nanotube (NT) polymer composites by the supercritical fluid (SCF) infusion method. Additionally incorporated metal particles or layers deposit preferentially on top of the dispersed nanotube percolation networks of the NT polymer composites using the SCF infusion to improve the shielding effects against EMEs. A high resolution scanning electron micrograph (HRSEM) of a typical MNPC is shown in FIG. 1. Nanotubes (Single wall carbon nanotubes (SWCNT) used in FIG. 1) appear as flexible curvy fibrils and the SCF infused nano-sized metal particles are shown as bright round spots in FIG. 1.

Metallized Nanotube Polymer Composite (MNPC) is primarily composed of
1. lightweight, high temperature, high performance polymer matrix,
2. highly strong, stiff reinforcing nanotubes, and 3. nanoparticle inclusions metallized by a SCF infusion method (or in situ chemical metallization with a metal complex with the polymer precursors: alternative method)

Each component of MNPC provides its unique role to develop viable multifunctional materials to protect main structures and their functions from EMEs. The selected polymer matrix provides weight reduction, thermal stability, and mechanical durability at elevated temperatures. Superstrong nanotube inclusions such as single wall carbon nanotubes (SWCNTs), multi wall carbon nanotubes (MWCNTs), boron carbon nitride nanotubes (BCNNTs), boron nitride nanotubes (BNNTs), or boron nanotubes (BNTs) provide additional mechanical reinforcement and thermal stability for the polymer matrix. Incorporation of the nanotubes (NTs) further decreases the coefficient of thermal expansion (CTE) of the polymer composite to match with those of reinforcing carbon fibers and non-replaceable metal frame structures at elevated temperatures. Further augmentation of electrical and thermal conductivity to reach lightning protection or electromagnetic interference (EMI) shielding levels is achieved by incorporating metal complex precursors into the NT-polymer composites using the supercritical carbon dioxide infusion method (or in situ chemical metallization as an alternative). This SCF metallization offers addition shielding capabilities against electromagnetic effects (EME: e.g. lightning and electromagnetic interference (EMI)) for airframes, automobiles, or electronic components without a weight penalty. EMI caused by lightning strikes can be shielded more efficiently by incorporating magnetic metals using magnetic particle precursors for SCF infusion because of their superior EM wave absorption capabilities. Improved thermal conductivity of the MNPC resulted from metal deposited NT can further improve lightning protection by dissipating excessive heat effectively without rapid thermal evaporation at strikes. The content and distribution of NT and metal inclusions can be effectively optimized for specific applications and flight conditions with the aid of the iterative study of 3-D characterization techniques with experimental results. Consequently, a suite of MNPC materials with tailorable properties will allow viable airframe structures to afford efficient, environmentally friendly, cost effective, safe flights with a long lifetime at high temperature environments for diverse flight conditions. Furthermore, lightweight MNPC can be used for EMI shielding materials for future automobile and electronic applications with the additional weight reduction.

In this invention, the NT-polymer composite is infused by swelling the polymer matrix with a solution of the penetrant (e.g. metal salts) in supercritical $CO_2$ fluid followed by rapid venting of the supercritical solution. The penetrant having lower diffusivity than gaseous $CO_2$ is retained by the nanotube-polymer composite. The diffusivity of $CO_2$ is typically much higher than any penetrants of interest. Since the nanotube surfaces provide abundant nucleation sites inside of the composite, the infused metal precursors or the reduced metals preferentially reside on the nanotube surfaces more than the polymer matrix. This preferential deposition of the metals on the percolated nanotube networks aid to improve the electrical and thermal conductivities of the composite. By selecting appropriate metal precursors, MNPC can provide sufficient electrical conductivities and magnetic properties to shield EMEs effectively. Lightning damage can be relieved by spreading the excessive currents and heat throughout the surrounding structure effectively by improving the electrical and thermal conductivity of the body attached by the lightning. EMI can be shielded by effective reflection by the highly conductive metallized nanotube networks and effective absorption by the incorporated magnetic nanoparticles throughout the MNPC. Metal deposition (size, distribution, and coverage) on the nanotube surfaces can be controlled by the types of metal precursors, the impregnation conditions such as concentration, time, temperature, and pressures. Employing appropriate co-solvents (e.g. ethanol) with SCF $CO_2$ depending on the metal precursors can help or accelerate the impregnation process.

Preparation of Ag-MNPC Films (Ag/SWCNT/βCNAO Polyimide Composite)

The Ag-MNPC was prepared by metallizing SWCNT polyimide ((β-CN)APB/ODPA (βCNAO)) composite films through the supercritical fluid impregnation with a metal precursor. First, the SWCNT/(β-CN)APB/ODPA polyimide (SWCNT/βCNAO) composite was prepared by in-situ polymerization under sonication and mechanical shear according to Chem. Phys. Lett., 364 (2002) 303 (Park et al), Chem. Phys. Lett. 391(2004) 207 (Wise et al), LAR16383 (United States Patent Application: 0030158323), LAR17126, and LAR17366. The (β-CN)APB/ODPA polyimide was synthesized as a matrix from a diamine, 2,6-bis (3-aminophenoxy) benzonitrile ((β-CN)APB), and a dianhydride, 4,4'-oxydiphthalic anhydride (ODPA). Purified HiPCO (High-Pressure CO Conversion http://nanotube.ms-u.edu/synthesis/hipco.html)-SWCNTs were purchased from Carbon Nanotechnologies, Inc. and used as received. Concentrations of SWCNT in the polyimide varied from 0 wt % to 10 wt %. The uniform thickness (about 50 µm) of composite films was controlled by a solution cast technique on a glass plate with a doctor's blade. For SCF infusion process, 1,5-Cyclooctadien-1,1,1,5,5,-hexafluoroacetylacetonato) silver(I), $[Ag(COD)(HFA)]_2$, was obtained from Aldrich Chemical Company (Milwaukee, Wis.) and was used as received. Carbon Dioxide was obtained from Air Products and Chemicals Inc. (Allentown, Pa.) padded with 2000 psi of helium. All supercritical fluid infusion experiments were performed using an Applied Separations (Allentown, Pa.) supercritical fluid system (Speed SFE). For impregnation, a thin strip of film, 20-70 wt % $[Ag(COD)(HFA)]_2$, and glass beads (⅓ volume of the vessel) were placed together in a 10 mL stainless steel supercritical extraction vessel (Keystone Scientific, Bellefonte, Pa.). All films were approximately 5 cm×1 cm rectangles, and the dimensions of each film remained constant after infusion and cure. Films were infused at 150° C. The $CO_2$ pressure and time of infusion was 5000 psi and 60 min, respectively, unless specified. After decompression, the film was removed from the vessel, the edges of the film were clamped between two glass plates and then heated at 250° C. in an oven for one hour. The resulted films were characterized by a series of measurements.

HRSEM micrographs of Ag-MNPC (10% SWCNT) are shown in FIG. 1, which reveal that metallized nanoparticles preferentially resided onto the surface of nanotubes inside of the composite. The SWNTs appeared as flexible curvy fibrils and the SCF infused nano-sized metal particles are shown as bright round spots in FIG. 1. The preferential diffusion toward nanotube surfaces appears to happen during the SCF infusion before curing (thermal reduction) as seen in Figures (c) and (f). Metal particle population in MNPC increases with increasing metal precursor concentrations. Increasing the SWCNT concentration of the initial NT-polymer composite increases the metal particle populations with smaller diameter particles, which increases the surface coverage of the nanotube by metal.

Figure 2:
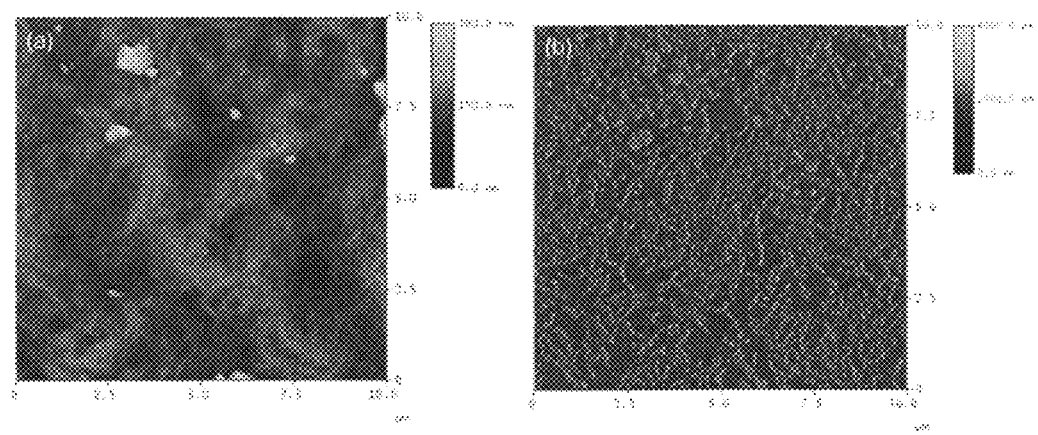
FIG. 2a shows a scanning probe micrograph of Ag/10 wt % SWCNT/β-CNAO prepared by 20% metallization solution with a topographic atomic force microscopy (AFM) image using tapping mode.
FIG. 2b shows scanning probe micrograph of Ag/10 wt % SWCNT/β-CNAO prepared by 20% metallization solution with a tunneling AFM image using TUNA mode.

FIG. 2 shows scanning probe micrographs with a topographic AFM image (FIG. 2(a)) and a tunneling AFM image (FIG. 2(b)) using TUNA mode. The tunneling image indicates that the infused metal particles (dotted string features) are tightly bound on the nanotube surface at least within tunneling distances. These tightly bound metal particles or metal coating can increase the electrical and thermal conductivities of the percolative nanotube networks, and therefore, those of the bulk NT-composite.

Figure 3:
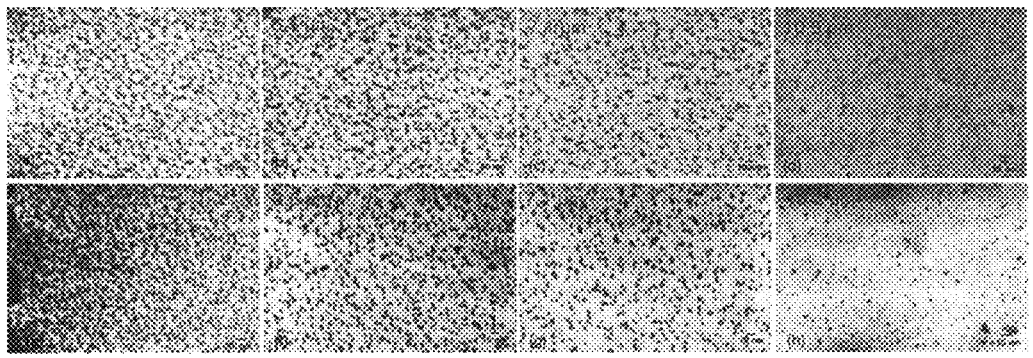
FIGS. 3a-d show scanning transmission electron mircrograph (STEM) micrographs of a microtomed Ag-MNPC (0.1% SWCNT) taken at specific locations from the surface without SWCNT.
FIGS. 3e-h show STEM micrographs of a microtomed Ag-MNPC (0.1% SWCNT) taken at specific locations from the surface with SWCNT.

FIG. 3 shows STEM micrographs of a microtomed Ag-MNPC (0.1% SWCNT) taken at specific locations from the surface without SWCNT (a-d) and with SWCNT (e-h). It is likely that the SCF infusion allows incorporating nano-sized particles inside of the bulk composites as deep as 10 μM with the given condition. The infusion depth can extend further by increasing the infusion time, temperature, and concentration.

Figure 4:
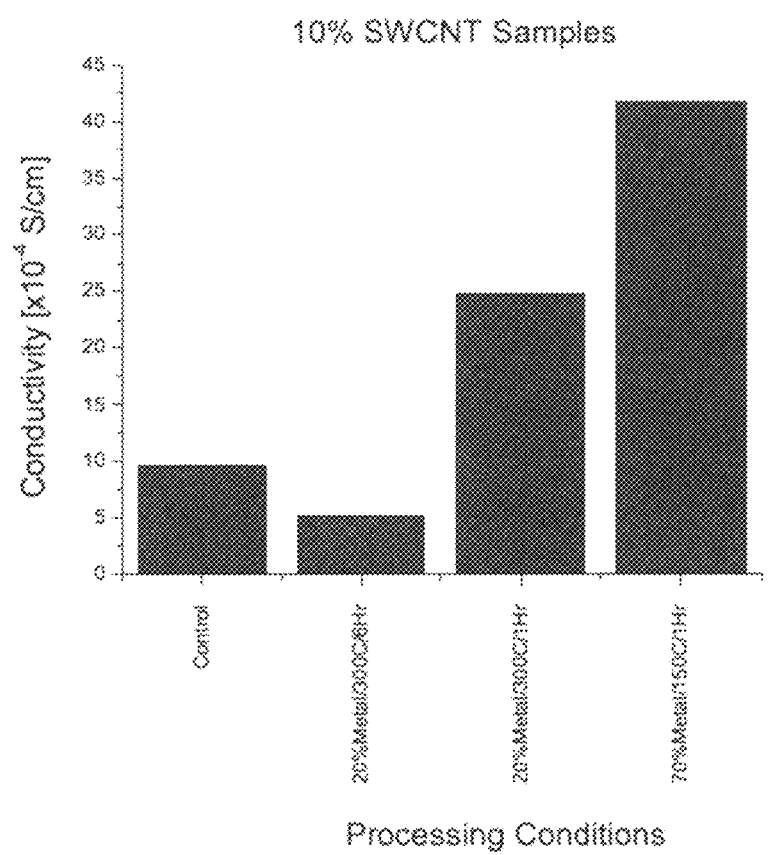
FIG. 4 is a graph showing the effects of metallization on the low frequency conductivity of Ag-MNPC samples containing 10% SWCNT.

FIG. 4 shows that the electrical conductivity at low frequency (below 0.1 Hz) of MNPC through thickness increased with metal infusion. The conductivity increases with increasing metal precursor concentrations and more than 300% increase for the 10% SWCNT-polyimide composite was achieved with a 70% metal precursor solution. Higher concentration and longer infusion time are likely to increase the conductivity further.

Figure 5:
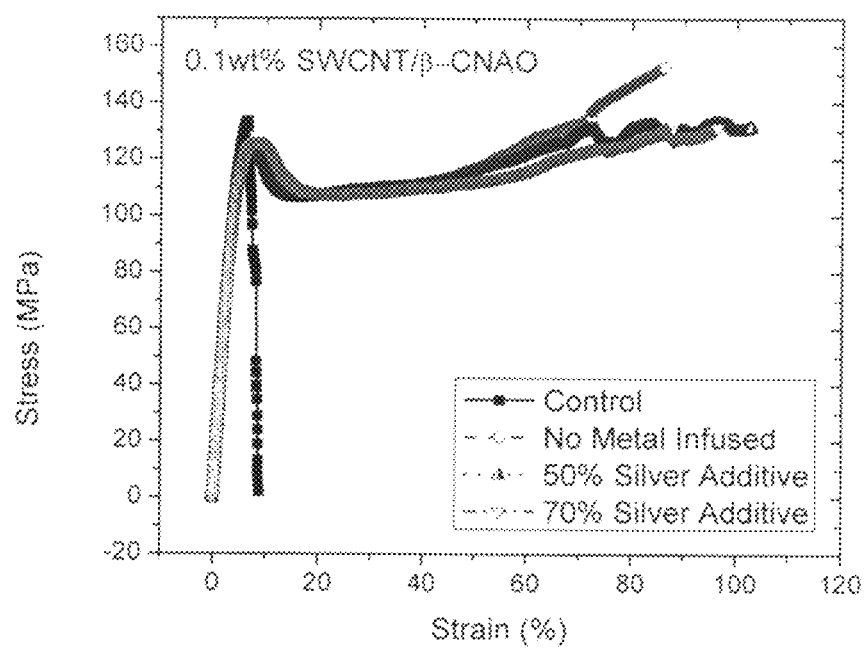
FIG. 5 is a graph of stress-strain curves of tensile tests for 0.1% SWCNT/β-CNAO composite (control): 0.1% SWCNT/β-CNAO composite processed by SCF without metal infusion (no metal infused), and Ag/0.1% SWCNT/β-CNAO composites prepared by 50% (50% silver additive) and 70% (70% silver additive) metallization solutions respectively.

Tensile test results of 0.1% SWCNT-polyimide composite (control), no metal infused MNPC (0.1% SWCNT), and Ag-MNPC (0.1% SWNT) are shown in FIG. 5. The % elongation at break for Ag-MNPC increased more than an order of magnitude than that of the control, and the work of rupture (toughness: area of the stress-strain curve) increased significantly after the SCF infusion process. This toughness increase is another benefit of the MNPC.

Figure 6:
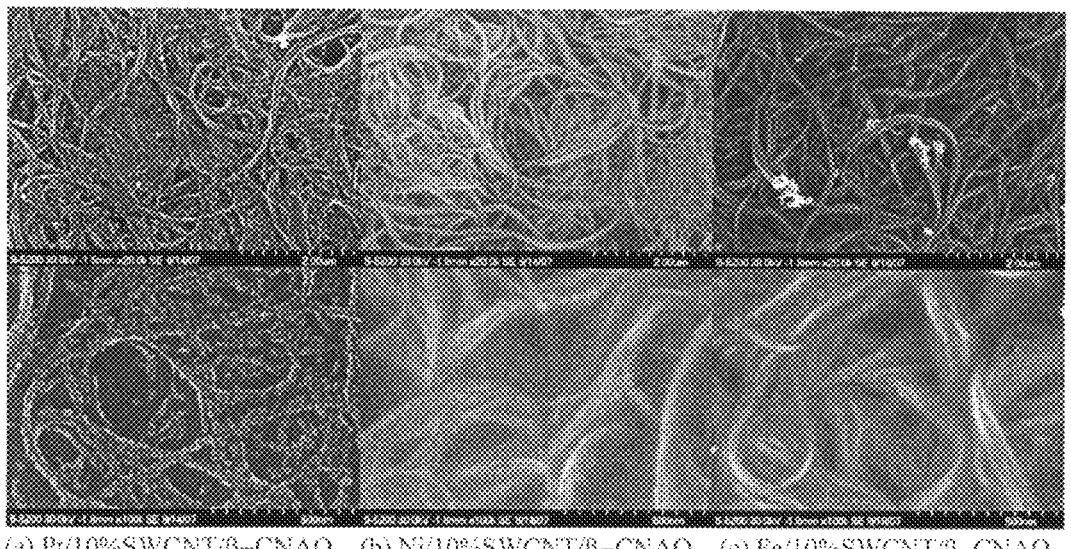
FIG. 6a shows an HRSEM micrograph of MNPC with Pt at 70% precursor solution with the 10% SWCNT-polyimide composite.
FIG. 6b shows an HRSEM micrograph of MNPC with Ni at 70% precursor solution with the 10% SWCNT-polyimide composite.
FIG. 6c shows an HRSEM micrograph of MNPC with Fe at 70% precursor solution with the 10% SWCNT-polyimide composite.

FIG. 6 shows HRSEM micrographs of the MNPCs with various infused metals. It is evident that Pt, Ni, and Fe as well as Ag were also successfully infused into the NT-polymer composites. Again, they reveal that nano-sized metal particles (Pt, Ni, and Fe) are deposited on the nanotube networks. The infused magnetic particles such as Ni and Fe can provide additional potentials for the MNPC materials to have effective EM absorption capabilities and to be used as flexible organic magnet materials. Multiple metals (magnetic, non-magnetic or a combination of magnetic and non-magnetic) can be impregnated into MNPCs simultaneously or sequentially to provide multifunctional properties more effectively.

The MNPC materials have numerous potential applications, such as: lightning protection for aerospace vehicles and automobiles; EMI shielding for aerospace vehicles, automobiles, and cell phones, and electronic devices; flexible organic magnet materials; highly conductive flexible materials for electrodes and supercapacitors; conductive and reflective solar sail gossamer structures; large scale deployable antennas which can manage EM signals in space; gas separation and filters; catalysts embedded in flexible membranes; or gas sensors.

Obviously, many modifications may be made without departing from the basic spirit of the present invention. Accordingly, it will be appreciated by those skilled in the art that within the scope of the appended claims, the inventions may be practiced other than has been specifically described herein. Many improvements, modifications, and additions will be apparent to the skilled artisan without departing from the spirit and scope of the present invention as described herein and defined in the following claims.

What is claimed is:

1. A composite shielding material for protecting against non-ionizing and ionizing radiation, comprising:
    a solid nanotube polymer composite, wherein the nanotubes are uniformly dispersed within the composite, the composite including:
        metal panicles on surfaces of the nanotubes; and
        metal particles on surfaces of the polymer of the solid nanotube polymer composite;
    wherein metal precursors are incorporated into the existing solid nanotube polymer composite by supercritical fluid infusion such that, upon reduction, the metal precursors are reduced to form the metal particles on the surfaces of the nanotubes inside the solid nanotube polymer composite.

2. The composite shielding material as set forth in claim 1, wherein the polymer composite is a film having a thickness, wherein the metal precursors are incorporated to a depth into the thickness of up to 10 micrometers, and wherein the metal particles are on top of dispersed nanotube percolation networks inside the solid nanotube polymer composite.

3. The composite shielding material as set forth in claim 1, wherein the polymer composite is a film having a thickness, wherein the metal precursors are incorporated to a depth into the thickness of 10 micrometers or more, and wherein the metal precursors are deposited on top of dispersed nanotube percolation networks inside the solid nanotube polymer composite by means of the supercritical fluid infusion.

4. The composite shielding material as set forth in claim 1 further comprising metal layers on top of dispersed nanotube percolation networks inside the solid nanotube polymer composite.

5. The composite shielding material as set forth in claim 1 further comprising metal layers on top of dispersed nanotube percolation networks inside the solid nanotube polymer composite, wherein the metal layers are deposited on top of the dispersed nanotube percolation networks by means of the supercritical fluid infusion.

6. The composite shielding material as set forth in claim 1 wherein the metal precursors are incorporated into the existing solid nanotube polymer composite by swelling the previously existing nanotube polymer by use of a penetrant in supercritical $CO_2$ fluid and by rapid venting of the supercritical fluid.

7. The composite shielding material as set forth in claim 6 wherein the penetrant has a lower diffusivity than gaseous $CO_2$.

8. The composite shielding material as set forth in claim 6 wherein the penetrant is a metal salt.

9. The composite shielding material as set forth in claim 1 wherein the metal precursors are reduced at a temperature of between 150° C. and 350° C. to form the metal particles.

10. A process for manufacturing a composite shielding material for protecting against non-ionizing and ionizing radiation, comprising:
    preparing a solid nanotube polymer composite, wherein the nanotubes are uniformly dispersed within the composite;
    incorporating metal precursors into the existing solid nanotube polymer composite by supercritical fluid infusion; and
    reducing the incorporated metal precursors to form metal particles, wherein the metal particles are formed on surfaces of the nanotubes and surfaces of the polymer of the solid nanotube polymer composite.

11. The process as set forth in claim 10 wherein the metal precursors are deposited on top of dispersed nanotube percolation networks inside the solid nanotube polymer composite, and the metal particles are on top of the dispersed nanotube percolation networks inside the solid nanotube polymer composite.

12. The process as set forth in claim 10 wherein the metal precursors are deposited on top of dispersed nanotube percolation networks inside the solid nanotube polymer composite by means of the supercritical fluid infusion.

13. The process as set forth in claim 10 wherein metal layers are deposited on top of dispersed nanotube percolation networks inside the solid nanotube polymer composite.

14. The process as set forth in claim 10 wherein metal layers are deposited on top of dispersed nanotube percolation networks inside the solid nanotube polymer composite by means of the supercritical fluid infusion.

15. The process as set forth in claim 10 further comprising the steps of swelling the existing solid nanotube polymer by using a penetrant in supercritical $CO_2$ fluid, and by rapid venting of the supercritical fluid.

16. The process as set forth in claim 15 wherein the penetrant has a lower diffusivity than gaseous $CO_2$.

17. The process as set forth in claim 15 wherein the penetrant is a metal salt.

18. The process as set forth in claim 10 wherein the reduction step occurs at a temperature between 150° C. and 350° C.

* * * * *